May 30, 1950  E. GROM  2,509,299
FOOD PRESERVATION
Filed May 7, 1945

INVENTOR
Edward Grom
BY John Flam
ATTORNEY

Patented May 30, 1950

2,509,299

UNITED STATES PATENT OFFICE 2,509,299

FOOD PRESERVATION

Edward Grom, Los Angeles, Calif.

Application May 7, 1945, Serial No. 592,472

6 Claims. (Cl. 99—154)

This invention relates to the freezing of perishable food, such as fruits, vegetables, meats, eggs, etc., to preserve their edible qualities for indefinite periods.

Preservation of food by application of cold is now quite generally practiced, but there are definite disadvantages which it is the aim of this invention to obviate.

Practically all foods that have been preserved by freezing lose their natural or original texture when they are thawed out or return to normal temperature. Especially do fresh fruits, such as plums, apricots, or berries, and vegetables, such as tomatoes, slump badly; they become soft and mushy, and the juices seep out; or, in other words, the food "bleeds."

Prior freezing processes do not avoid these serious after-effects.

Accordingly, it is an object of this invention to make it possible to provide an improved freezing method in which the original texture of the food remains substantially intact.

As an adjunct to the process of preservation by chilling or freezing, the steps of bleaching or sugaring, or both, are often used. As regards bleaching, this is advantageous where the fruit or other food contains natural acids which, if unbleached, would oxidize or cause discoloration. Sugaring is needed when the food does not contain sufficient natural sugar to prevent decomposition. In any case, these auxiliary steps may be employed in the practice of the present invention.

An important factor in practicing the invention is the use of fluid pressure during any of the steps of sugaring, bleaching, and chilling, or during any combination of such steps.

The fluid pressure may be created as an increase in the atmospheric pressure, or by the aid of a liquid medium in which the food is submerged. Such an increase in pressure causes the freezing to occur with a marked reduction in the attendant destruction of the cellular structure.

It is accordingly another object of this invention to make it possible effectively to utilize the application of pressure.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings.

In the present instance, the process will be described specifically for fresh fruit; but, by appropriate modifications, the process may be adapted to other types of foods, such as meat, eggs, vegetables, etc., which may be preserved by a chilling process.

In some instances the acid content of the food to be preserved would cause staining and spoiling unless neutralized. For this purpose a bleaching agent, such as sulphur dioxide, may be employed. Furthermore, if the food lacks a sufficient amount of sugar to ensure preservation, this constituent should be added prior to the freezing operation.

The step of bleaching and sugaring may be accomplished in succession; or one of them may be omitted as desired. Where both bleaching and sugaring are required, these steps may be conveniently effected simultaneously.

Figure 1:
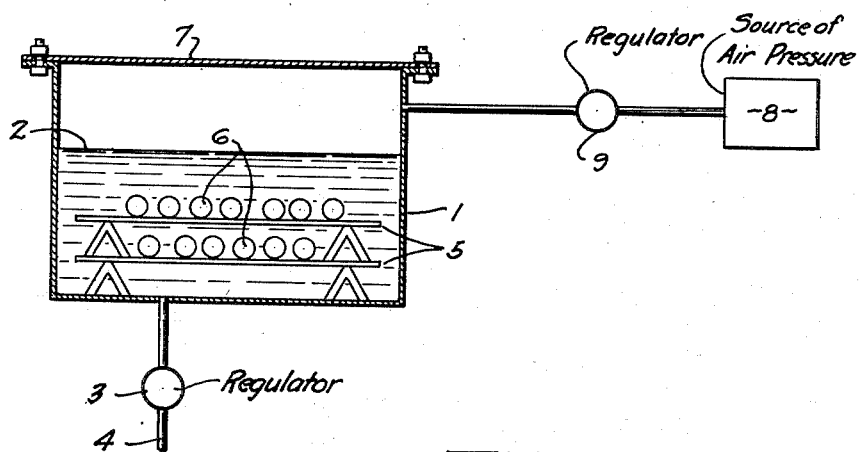
Figure 1 is a diagram illustrating one of the steps in the process.

Thus, in Fig. 1, these preliminary steps of bleaching and sugaring are effected by the aid of a sealed tank or container 1. The tank 1 is shown as partially filled with a syrup 2 or other appropriate preserving liquid with which the bleaching agent is blended. The bleaching agent may be admitted from an appropriate source through a valve or regulator 3 interposed in a conduit 4 leading to the inside of the container 1. The bleaching agent, such as sulphur dioxide gas, or other material, may be blended in this manner with the syrup 2; or else it may, if desired, be blended manually before the tank 1 is sealed or covered.

By appropriate means, racks, such as 5, may be filled with the food or fruit 6 to be preserved; and they are supported in a position where the racks are totally submerged in the syrup 2.

The food 6, if it be fruit such as apricots or peaches, is, of course, first pitted, skinned, and sorted before being placed upon the racks 5.

The cover 7 of the tank 1 seals the space within the tank. Then compressed air can be forced into the tank at a suitable pressure and for a suitable time, depending upon the particular food 6 that is being treated. For this purpose, a source 8 of compressed air may be utilized, and which is connected through a pressure regulator or valve 9 to the space within the tank and above the level of the syrup 2.

The elevation of the pressure exerted upon the food 6 in this manner can be provided by other fluids than air as, for example, by the aid of additional syrup. However, in either case, the bleaching and sugaring are accomplished evenly and uniformly to exert pressures on substantially the entire surface of the food 6. This elevation of the fluid pressure is sufficient to provide for uniform sugaring and bleaching without material injury to the cells of the fruit, and also to force a protective coating over the fruit.

Figure 2:
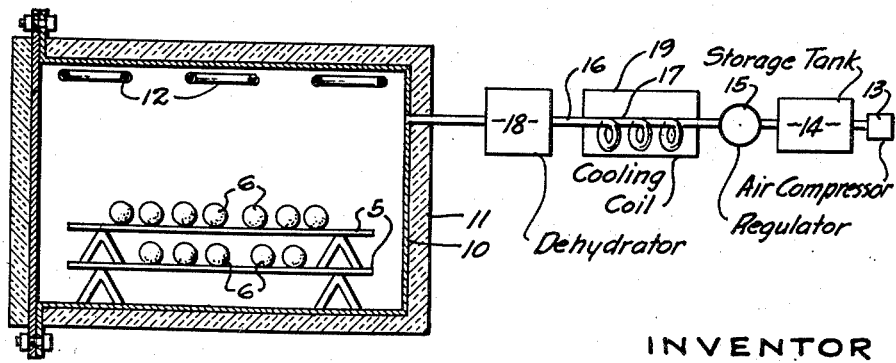
Fig. 2 is a diagram illustrating a succeeding step.

After the sugaring or bleaching, or both, is accomplished, the pressure can be released; and the racks 5 with the fruit 6 thereon may be removed, and the syrup allowed to drain from the fruit, which then assumes a glazed appearance. The fruit 6 on the racks 5, or other containers, is then placed in a container 10 (Fig. 2) where it is chilled to an appropriate temperature, again under fluid pressure. This container 10 is adapted to be sealed and may be provided with a layer 11 of insulation. A cooling coil 12, shown diagrammatically, is arranged to cool the food, as by being located within container 11, and may be, for example, an evaporator of a liquid refrigerant.

In this instance, the source of fluid pressure is an air compressor 13, feeding compressed air to a storage tank 14. A pressure regulator valve, or the like, 15, serves to control the air pressure in its passage to the interior of tank 11. Interposed in the conduit 16 leading to the inside of tank 11 there may be a cooling coil 17 to withdraw any heat generated in the process of compression. The conduit 16 may also include one or more dehydrator filters 18 to withdraw any moisture that the air may carry. The air then passes into the sealed container 10 through one or more inlets. The pressure and duration of the process are determined by experience to obtain the most favorable results.

If it be desired to ensure that the heat content of the air stream will not disturb the temperature conditions in the container 10, the cooling coil 17 may be submerged in a refrigerating agent, as by the aid of a tank 19. In this way, much greater cooling effect can be obtained.

Simultaneous subjection of the fruit to pressure and cooling ensures that the fruit is restricted against expansion in the freezing process, thereby limiting the destruction of the texture. In this way, the texture can be retained substantially in its natural and original state. A more uniform cold penetration is also secured, and the outer surface of the fruit does not break or split when held in storage.

After the process has been effected, the frozen food can be kept in a cooled space for an indefinite period. The step of applying the bleaching agent under pressure is also important, since it ensures a greater penetration of the bleach in the food stuff and prevents for a greater period any discoloration upon exposure of the preserved fruit to the air.

The inventor claims:

1. A process of preserving fresh and uncooked food which comprises submerging such food in a syrup composition including a bleach; during such submerging subjecting the composition to an elevated fluid pressure; and chilling the fresh and uncooked food while elevating the fluid pressure to which the food is subjected directly.

2. A process of preserving fresh and uncooked food which comprises first submerging such food in a syrup composition; during such submerging elevating the fluid pressure exerted upon the composition while said composition is in its cold state; draining surplus syrup from the food; and chilling the food while elevating the fluid pressure to which the food is subjected directly.

3. A process of preserving fresh and uncooked food which comprises treating such food by submerging it in a liquid preservative composition; during such submerging elevating the fluid pressure to which the composition is subjected while said composition is in its cold state; placing the treated food in an atmosphere within a chamber; applying pressure to said atmosphere in said chamber; and chilling said atmosphere.

4. A process of preserving fresh and uncooked food which comprises treating such food by submerging it in a syrup composition including a bleach; during such submerging subjecting the composition to an elevated fluid pressure while said composition is in its cold state; placing the treated food in an atmosphere within a chamber; applying pressure to said atmosphere in said chamber and directly to said food; and chilling said atmosphere.

5. A process of preserving fresh and uncooked food which comprises treating such food by submerging it in a syrup composition; during such submerging elevating the fluid pressure exerted upon the composition while said composition is in its cold state; draining surplus syrup from the treated food; then placing the food in an atmosphere within a chamber; applying pressure to said atmosphere and directly to said food; and chilling said atmosphere.

6. A process of preserving fresh and uncooked food which comprises treating such food by submerging it in a liquid preservative composition; during such submerging elevating the fluid pressure to which the composition is subjected while said composition is in its cold state; then placing the treated food in an air atmosphere within a chamber; applying pressure to said air atmosphere in said chamber and directly to said food; and chilling the air atmosphere by aid of a fluent refrigerant that is out of contact with the food and atmosphere.

EDWARD GROM.

REFERENCES CITED

The following references are of record in the file of this patent:

UNITED STATES PATENTS

| Number | Name | Date |
|---|---|---|
| 91,557 | Norny | June 22, 1869 |
| 818,979 | Scheele | Apr. 24, 1906 |
| 1,145,333 | Penn | July 6, 1915 |
| 1,560,396 | Navarre | Nov. 3, 1925 |
| 1,634,295 | McLaughlin | July 5, 1927 |
| 1,726,482 | Gerhardt | Aug. 27, 1929 |
| 1,898,758 | Bottoms | Feb. 21, 1933 |
| 1,933,257 | Goosman | Oct. 31, 1933 |
| 1,944,857 | Atwell | Jan. 23, 1934 |
| 1,963,674 | Pearsons | June 19, 1934 |
| 2,019,030 | Tucker | Oct. 29, 1935 |
| 2,137,902 | Walter | Nov. 22, 1938 |
| 2,309,007 | Parsons | Jan. 19, 1943 |
| 2,340,145 | Rogers | Jan. 25, 1944 |
| 2,345,204 | Lodwig | Mar. 28, 1944 |